US010038200B2

(12) United States Patent
Kim et al.

(10) Patent No.: US 10,038,200 B2
(45) Date of Patent: Jul. 31, 2018

(54) METHOD OF PRODUCING PT ALLOY CATALYST USING PROTECTIVE COATING OF CARBON LAYER AND OZONE

(71) Applicants: HYUNDAI MOTOR COMPANY, Seoul (KR); KIA MOTORS CORPORATION, Seoul (KR); INDUSTRY-ACADEMY COOPERATION FOUNDATION, YONSEI UNIVERSITY, Seoul (KR)

(72) Inventors: Won Jung Kim, Seoul (KR); Ju Hee Lee, Seoul (KR); Jun Tae Kim, Yongin-si (KR); You Jung Song, Suwon-si (KR); Ju Ahn Park, Gwangju (KR); Han Sung Kim, Seoul (KR); Woong Hee Lee, Seoul (KR)

(73) Assignees: HYUNDAI MOTOR COMPANY, Seoul (KR); KIA MOTORS CORPORATION, Seoul (KR); INDUSTRY-ACADEMY CORPORATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/838,069

(22) Filed: Dec. 11, 2017

(65) Prior Publication Data
US 2018/0166698 A1 Jun. 14, 2018

(30) Foreign Application Priority Data
Dec. 13, 2016 (KR) .................. 10-2016-0169530

(51) Int. Cl.
*B01J 23/42* (2006.01)
*B01J 23/56* (2006.01)
(Continued)

(52) U.S. Cl.
CPC ......... *H01M 4/926* (2013.01); *H01M 4/8825* (2013.01); *H01M 4/9041* (2013.01); *H01M 4/9083* (2013.01)

(58) Field of Classification Search
CPC . B01J 21/185; B01J 23/42; B01J 23/56; B01J 23/6482; B01J 23/6522;
(Continued)

(56) References Cited

U.S. PATENT DOCUMENTS 5,182,016 A *  1/1993  Funkenbusch ........... B01J 20/06
                                                    210/198.2
7,875,569 B2 *  1/2011  Roev ..................... B01J 23/8913
                                                    420/461
(Continued)

FOREIGN PATENT DOCUMENTS

KR   2012-0057432   *  6/2012  .............. B01J 23/89
KR   10-1231006 B1    2/2013
(Continued)

*Primary Examiner* — Patricia L. Hailey
(74) *Attorney, Agent, or Firm* — McDermott Will & Emery LLP

(57) ABSTRACT

A method of producing a catalyst including a platinum-transition metal alloy on carbon, more specifically, a method of producing a carbon supported platinum alloy catalyst with high activity and superior durability includes coating a carbon-supported catalyst with an organic polymer as a material for a carbon layer, heat-treating the catalyst under a hydrogen-deficient atmosphere to convert the organic polymer into the carbon layer to prevent growth of catalyst particles caused by heat treatment through the carbon layer, allowing, at the same time, a transition metal supported together with platinum to be diffused into platinum particles to form a catalyst having a core-shell structure including a platinum skin layer on a surface thereof, and removing the carbon layer by ozone treatment after the heat treatment to induce an electrochemical reaction on the surface of the catalyst.

20 Claims, 15 Drawing Sheets

(51) Int. Cl.
  *B01J 37/14* (2006.01)
  *H01M 4/92* (2006.01)
  *H01M 4/90* (2006.01)
  *H01M 4/88* (2006.01)

(58) Field of Classification Search
  CPC ............... B01J 23/8906; B01J 23/8913; B01J 23/8926; B01J 37/14; H01M 4/926; H01M 4/8825; H01M 4/9041; H01M 4/9083
  USPC .................. 502/182, 184, 185; 420/466–468
  See application file for complete search history.

(56) References Cited

U.S. PATENT DOCUMENTS

| | | | | |
|---|---|---|---|---|
| 2006/0178260 | A1* | 8/2006 | Zhong | B22F 9/24 502/185 |
| 2009/0246601 | A1* | 10/2009 | Iwata | C25D 9/02 429/405 |
| 2011/0129762 | A1* | 6/2011 | Lee | B82Y 30/00 429/524 |
| 2011/0244363 | A1* | 10/2011 | Min | H01M 4/92 429/483 |
| 2012/0135137 | A1* | 5/2012 | Roh | B82Y 30/00 427/115 |
| 2014/0087289 | A1* | 3/2014 | Chokai | H01M 4/90 429/523 |
| 2015/0255802 | A1* | 9/2015 | Kim | H01M 4/926 429/524 |
| 2015/0280249 | A1* | 10/2015 | Yi | C22C 5/04 429/524 |

FOREIGN PATENT DOCUMENTS

| | | | | |
|---|---|---|---|---|
| KR | 2015-105742 | * | 9/2015 | ............. B01J 23/42 |
| KR | 10-1597970 B1 | | 2/2016 | |

* cited by examiner

METHOD OF PRODUCING PT ALLOY CATALYST USING PROTECTIVE COATING OF CARBON LAYER AND OZONE

CROSS-REFERENCE TO RELATED APPLICATION

This application is based on and claims the benefit of priority to Korean Patent Application No. 10-2016-0169530 filed on Dec. 13, 2016 with the Korean Intellectual Property Office (KIPO), the disclosure of which is incorporated herein in its entirety by reference.

TECHNICAL FIELD

The present disclosure relates to a method of producing a catalyst including a platinum-transition metal alloy on carbon. More specifically, it relates to a method of producing a carbon supported platinum alloy catalyst with high activity and superior durability, which includes coating a carbon-supported catalyst with an organic polymer as a material for a carbon layer, heat-treating the catalyst under a hydrogen-deficient atmosphere to convert the organic polymer into the carbon layer to prevent growth of catalyst particles caused by heat treatment through the carbon layer, allowing, at the same time, a transition metal supported together with platinum to be diffused into platinum particles to form a catalyst having a core-shell structure including a platinum skin layer on a surface thereof, and removing the carbon layer by ozone treatment after the heat treatment to induce an electrochemical reaction on the surface of the catalyst.

BACKGROUND

Platinum (Pt)-based precious metals are generally used as catalysts for oxidation/reduction reactions of fuel cells. However, the platinum-based catalysts have not been commercialized due to their high price. To solve this, research on platinum alloy catalysts or non-platinum-based catalysts has been underway. The non-platinum-based catalysts are practically inapplicable to fuel cells due to their low activity. On the other hand, the platinum alloy catalysts contain another metal with a predetermined ratio instead of platinum and have advantages of economic benefits due to decreased amount of platinum and improved catalytic activity caused by alloy effects.

Research has been actively conducted on $Pt_3M$ having a face-centered cubic structure alloyed with platinum (Pt) and a transition metal (M=Ti, V, Cr, Fe, Co, Ni) as one of platinum alloy catalysts for fuel cells. A general method of producing an alloy catalyst is co-precipitation including simultaneously reducing a platinum salt and a transition metal salt. In accordance with the co-precipitation, based on difference in reduction potential, platinum is first reduced and the transition metal is then reduced so that the alloy surface is rich in the transition metal. As a result, the transition metal is eluted under an acidic environment of the fuel cell, causing a problem such as deteriorating performance of the fuel cell. Accordingly, to solve this problem, efforts are made to produce a platinum alloy having a core-shell structure including a platinum skin layer. A general method of forming a core-shell structure is conducted using difference in solid diffusion between platinum and a transition metal based on heat treatment at a high temperature of 700 to 1200° C. However, since catalyst particles severely agglomerate and grow during the high-temperature heat treatment, effective surface area of the catalyst is decreased and the overall catalytic activity is thus deteriorated.

To solve these problems, recently, research has been underway to produce a variety of core-shell-type platinum alloy catalysts. The Adzic research team produced a platinum monolayer alloy catalyst having a core-shell structure using under potential deposition (UPD). The Strasser research team produced a platinum alloy having a core-shell structure catalyst, a transition metal of which is removed from the surface by a dealloying reaction according to an electrochemical method. The Strasser research team produced an alloy catalyst by preparing a transition metal core and depositing a platinum shell thereon. These methods enable preparation of core-shell type alloy catalysts, but all of them are disadvantageously unsuitable for mass-production because they need to control the voltage of respective particles in an electrochemical manner.

In order to solve these problem, Dr. Han-sung Kim's research team developed a method of inhibiting growth of platinum alloy catalysts during high-temperature heat treatment by introducing polypyrrole (PPy) and polydopamine (PDA) as capping materials. In accordance with this method, when a polymer protective coating is formed on a carbon supported platinum catalyst, a transition metal is impregnated in the protective coating and heat treatment is conducted, the polymer protective coating is thermally decomposed and the transition metal present in the polymer protective coating diffuses into platinum particles to form a core-shell structure. In this process, the polymer protective coating functions to suppress particle growth which may be caused by agglomeration of platinum particles. However, as high-temperature heat treatment is conducted, the polymer protective coating is gradually removed, decreasing the ability to suppress agglomeration. When growth of particles is not sufficiently suppressed, the problem of size unbalance between particles remains.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to solve the above-described problems associated with the prior art.

The present disclosure is to provide a method of producing a platinum alloy catalyst for fuel cells.

Specifically, the present disclosure is to provide a method of producing a platinum alloy catalyst, the method includes a series of steps including protectively coating a carbon-supported catalyst surface with a carbon layer, which is not decomposed by high-temperature heat treatment, to effectively suppress an increase in catalyst particle size, forming a platinum skin layer including platinum particles densely dispersed on catalyst surfaces during high-temperature heat treatment to impart a core-shell structure to the catalyst, and conducting ozone treatment having no influence on increase in catalyst particle size to remove the protectively coated-carbon layer.

In one aspect, the present disclosure provides a method of producing a carbon supported platinum alloy catalyst including coating, with an organic polymer, a Pt/C catalyst including platinum (Pt) supported on a carbon support, depositing a transition metal (M) precursor on the organic polymer-coated Pt/C catalyst and heat treating the Pt/C catalyst under a hydrogen-deficient atmosphere to produce a carbon layer-coated Pt-M/C catalyst, and treating the carbon layer-coated Pt-M/C catalyst with ozone ($O_3$) to produce a carbon supported platinum alloy (Pt-M/C) catalyst, the carbon layer of which is removed.

In another aspect, the present disclosure provides a method of producing a carbon supported platinum alloy catalyst including coating, with an organic polymer, a Pt-M/C catalyst including platinum (Pt) and a transition metal (M) supported on a carbon support, heat-treating the organic polymer-coated Pt-M/C catalyst under a hydrogen-deficient atmosphere to produce a carbon layer-coated Pt-M/C catalyst, and treating the carbon layer-coated Pt-M/C catalyst with ozone ($O_3$) to produce a carbon supported platinum alloy (Pt-M/C) catalyst, the carbon layer of which is removed.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

DETAILED DESCRIPTION

Hereinafter, reference will now be made in detail to various embodiments of the present disclosure, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail with reference to the annexed drawings.

The present invention provides a method of producing a platinum alloy catalyst including platinum and a transition metal supported on a carbon support.

Figure 1:
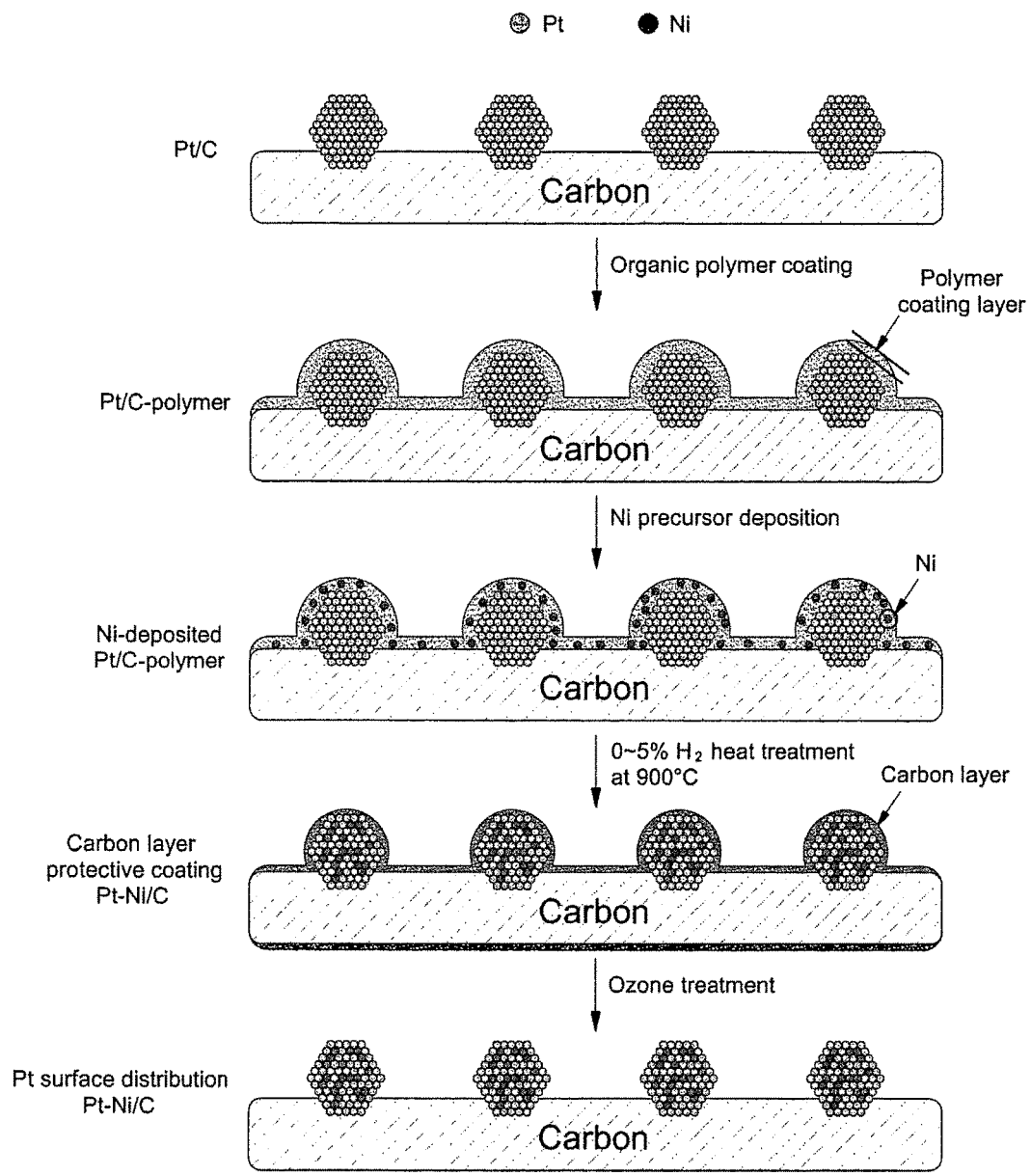
FIG. 1 is a schematic diagram showing a method of producing a carbon supported platinum alloy catalyst by using, as a protective coating, a carbon layer formed by heat treatment after precursor deposition and removing the carbon layer by ozone.

The method according to the present disclosure, as shown in the schematic diagram of FIG. 1, includes heat-treating a catalyst coated with an organic polymer in the absence of hydrogen to produce a catalyst protectively coated with a carbon layer and removing the carbon layer by ozone treatment.

The method of producing a carbon supported platinum alloy catalyst according to the present disclosure may be broadly divided into two methods.

The first method includes coating a Pt/C catalyst including platinum supported on a carbon support with an organic polymer, depositing a transition metal precursor thereon, and conducting heat treatment and ozone treatment. The second method includes coating a Pt/C catalyst including platinum and a transition metal (M) supported on a carbon support with an organic polymer, and conducting heat treatment and ozone treatment thereon.

One of generally used methods of producing platinum alloy catalysts is precursor deposition. The precursor deposition is a method of producing an alloy catalyst including first supporting platinum on a carbon support, mixing the supported substance with a precursor for a desired alloy element and conducting high-temperature heat treatment to produce an alloy catalyst. The method according to the present disclosure also uses precursor deposition to produce a platinum alloy catalyst. The method of the present disclosure includes coating, with an organic polymer, a Pt/C catalyst including platinum and a transition metal (M) supported on a carbon support and conducting high-temperature heat treatment under a hydrogen-deficient inert gas atmosphere to convert the organic polymer into a carbon layer, and removing the carbon layer by ozone treatment.

The transition metal (M) used for production of the platinum alloy catalyst according to the present disclosure is a transition metal element on the periodic table and specifically includes at least one selected from the group consisting of nickel (Ni), palladium (Pd), copper (Cu), silver (Ag), gold (Au), titanium (Ti), zirconium (Zr), vanadium (V), chromium (Cr), iron (Fe), ruthenium (Ru), cobalt (Co) and rhodium (Rh). The transition metal (M) is used in the form of a salt and the salt may be selected from nitrate, sulfate, acetate, chloride and oxide.

The organic polymer used for production of the platinum alloy catalyst according to the present disclosure is a polymer containing a carbon atom as a main ingredient. Any polymer that can be carbonized by high-temperature heat treatment under an inert gas atmosphere may be used. The organic polymer specifically includes at least one selected from the group consisting of polypyrrole (PPy), polyaniline (PANI) and polydopamine (PDA), but the present invention is not limited thereto.

The support material used for production of platinum alloy catalyst according to the present disclosure is an ordinary carbon support material that is used as a support capable of supporting a metal. The carbon support material includes at least one selected from the group consisting of carbon black and crystalline carbon. The crystalline carbon may be specifically selected from the group consisting of carbon nanotube (CNT), carbon nanofiber (CNF), carbon nanocoil, and carbon nanocage (CNC). There is no particular limitation as to selection of the carbon support material in the present disclosure.

In an aspect of the present disclosure, by heat-treating a Pt-M/C catalyst including supported platinum and a transition metal, a platinum alloy catalyst can be prepared and at the same time, the organic polymer is carbonized to coat the catalyst surface with a carbon layer. The heat treatment is conducted under a hydrogen-deficient inert gas atmosphere, preferably under an inert gas atmosphere, at 700° C. to 1,200° C. wherein the content of hydrogen in the inert gas is limited to 5% or less by volume. This is the reason that, when the hydrogen content is abundant, the organic polymer is decomposed and removed during high-temperature heat treatment and the desired carbon layer cannot be formed on the catalyst surface. Accordingly, hydrogen content is preferably extremely limited during heat treatment.

In an aspect of the present disclosure, the carbonized layer is removed by ozone treatment to produce a highly active platinum alloy catalyst including platinum dispersed at a high density on the surface thereof. The ozone treatment includes applying ozone gas ($O_3$) to the catalyst. The ozone treatment enables the carbonized carbon layer with a low degree of crystallinity to be easily removed, while it does not enable carbon support materials including crystalline carbon to be easily removed.

The present disclosure includes refluxing using an acidic solution to remove impurities of the platinum alloy catalyst, the carbon layer of which is removed by ozone treatment. The acidic solution may be a sulfuric or hydrochloric acid solution with a concentration of 1 to 10M. After reflux, the resulting platinum alloy catalyst is thoroughly washed and dried to collect a desired platinum alloy catalyst.

Hereinafter, the present invention will be described in more detail with reference to examples and test examples. However, these examples are provided only for illustration of the present invention and the scope of the present invention is not limited to the examples.

EXAMPLE

Example 1

Production of Platinum- and Nickel-Supported Alloy Catalyst 50 mg of 1-pyrene carboxylic acid (1-PCA) and 100 mg of carbon nanocage (CNC) were dispersed in 20 mL of ethanol and stirred for 2 hours. After stirring, 1-PCA-doped crystalline carbon was collected using a vacuum filtration apparatus. This step functions to make the surface of crystalline carbon hydrophilic based on $\pi$-$\pi$ interaction between 1-PCA and crystalline carbon, and thereby to facilitate support of platinum.

110 mg of 1-PCA-doped crystalline carbon was added to 25 mL of ethylene glycol, followed by stirring for about 10 minutes. After stirring, $PtCl_4$ was added to the reaction solution, followed by stirring for 15 minutes. After stirring, 75 mg of sodium hydroxide (NaOH) was added to control pH and thereby reduce a platinum particle size, followed by stirring for 15 minutes. After sodium hydroxide was dissolved, the solution was refluxed using microwave at 160° C. for 10 minutes. At this time, platinum ions were reduced and adsorbed on the crystalline carbon surface. To increase a platinum support ratio, after reflux, the reaction solution was stirred at room temperature for 12 hours, pH thereof was then decreased to 2 and stirring was further conducted for 24 hours. After completion of stirring, the reaction solution was filtered using a suction filtration apparatus to collect a solid and the solid was washed with ultrapure water three times and dried at 160° C. to remove impurities, thereby obtaining a carbon supported platinum (Pt/C) catalyst.

To coat the carbon supported platinum (Pt/C) catalyst with a carbon layer, the carbon supported platinum (Pt/C) catalyst was coated with an organic polymer and the organic polymer used was polypyrrole. Specifically, 175 mg of the carbon supported platinum (Pt/C) catalyst was added to 20 mL of ethanol, followed by stirring. Then, 50 mg of a pyrrole monomer was added to the reaction solution, followed by stirring at 4° C. for 1 hour. After stirring, 228 mg of ammonium persulfate used as an oxidant was dissolved in 100 mL of water to prepare an aqueous ammonium persulfate solution and stirring was conducted in 6.5 mL of the aqueous ammonium persulfate solution at 4° C. for 12 hours in a reactor. In this step, the pyrrole monomer was polymerized into polypyrrole (PPy). After polymerization, a solid was collected using a vacuum filtration apparatus and was then thoroughly washed with water and ethanol. The solid was dried at 40° C. in a vacuum oven for 12 hours. At this time, the collected solid was a Pt/C (platinum on carbon) catalyst coated with polypyrrole.

64 mg of nickel (II) nitrate hexahydrate ($Ni(NO_3)_2 6H_2O$) and 66.6 mg of ethylene diamine were stirred in 20 mL of ultrapure water, the polypyrrole-coated carbon-supported platinum (Pt/C) catalyst described above was added thereto and refluxed at 80° C. for 3 hours. After reflux, ultrapure water was evaporated using a vacuum evaporator to collect a transition metal-supported polypyrrole-coated carbon-supported platinum (Pt—Ni/C) catalyst.

The transition metal-supported polypyrrole-coated carbon-supported platinum (Pt—Ni/C) catalyst described above was placed in a furnace and was heat-treated at 900° C. under an atmosphere containing 95% argon by volume and 5% hydrogen by volume for 1 hour. At this time, the amount of hydrogen could be used within the range that the carbon layer was entirely removed. After heat treatment, ozone gas (O3) was applied at 25° C. for 7 minutes to remove the carbon layer. At this time, the ozone could be used at a temperature of 180° C. or less. After ozone treatment, to remove impurities, the catalyst was refluxed in 0.5M sulfuric acid at 80° C. for 3 hours. After reflux, the residue was thoroughly washed and dried to obtain the target platinum alloy catalyst.

Example 2

Production of Platinum- and Nickel-Supported Alloy Catalyst

A platinum alloy catalyst was produced in the same manner as in Example 1, except that carbon nanotube (CNT) was used as a support material, instead of carbon nanocage (CNC) as crystalline carbon.

Comparative Example 1

Production of Platinum- and Nickel-Supported Alloy Catalyst

The process of coating the carbon supported platinum (Pt/C) catalyst with a polypyrrole polymer was omitted, nickel was supported on the carbon supported platinum (Pt/C) catalyst by precursor deposition in the same manner as in Example 1, heat treatment was conducted at 900° C. under a hydrogen atmosphere (the volume ratio of argon to hydrogen=80:20) for 1 hour, and a platinum alloy catalyst was produced without additional ozone treatment. That is, the platinum alloy catalyst was produced by omitting the processes of coating with polypyrrole and ozone treatment in Example 1. Because there was no polymer coating to be carbonized, heat treatment was conducted with the content of hydrogen increased.

Comparative Example 2

Production of Platinum- and Nickel-Supported Alloy Catalyst

In the same manner as in Example 1, the carbon supported platinum (Pt/C) catalyst was coated with a polypyrrole polymer, nickel was supported on the carbon supported platinum (Pt/C) catalyst by precursor deposition, heat treatment was conducted at 900° C. under a hydrogen atmosphere (the volume ratio of argon to hydrogen=80:20) for 1 hour, and a platinum alloy catalyst was produced without an additional ozone treatment. That is, the platinum alloy catalyst was produced by conducting high-temperature heat treatment under a condition where the content of hydrogen is higher than in Example 1 to avoid formation of the carbon layer, and omitting the ozone treatment to remove the carbon layer after heat treatment.

TEST EXAMPLE

Test Example 1

Figure 2:
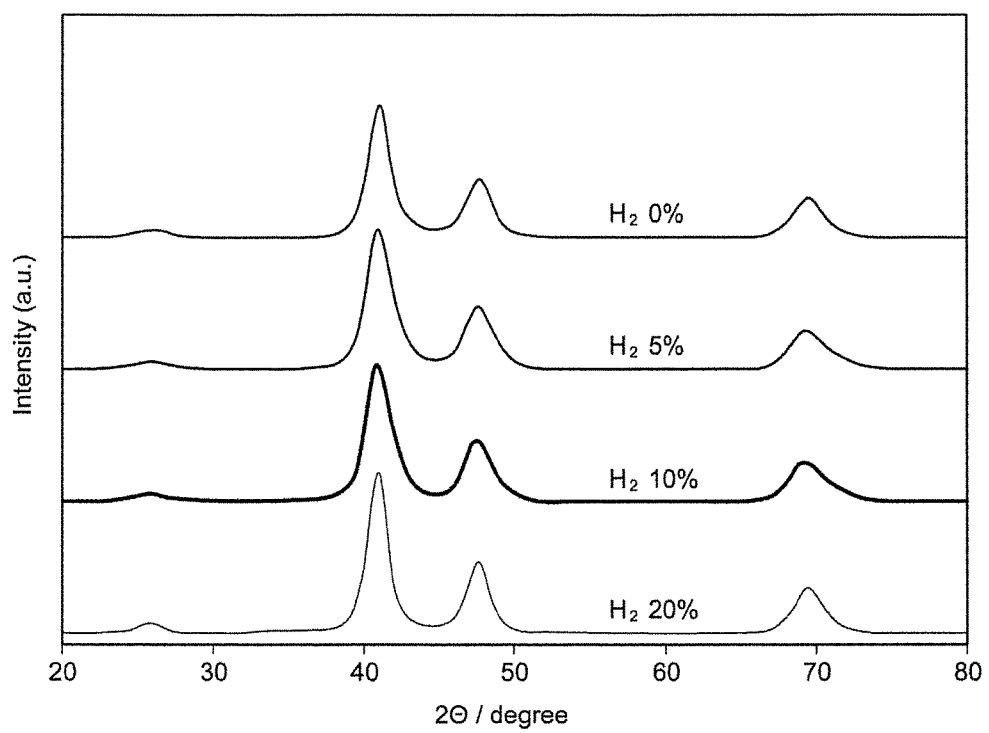
FIG. 2 is an image showing XRD patterns of carbon-supported platinum-nickel alloy catalysts with superior durability produced under different hydrogen contents of 0, 5, 10 and 20% by volume, with respect to argon, upon heat treatment after supporting nickel on a polypyrrole (PPy) polymer-coated carbon supported platinum catalyst by precursor deposition.

Effects of Hydrogen Content on Platinum Particle Size and Alloy Ratio During Heat Treatment FIG. 2 shows X-ray diffraction results of catalysts produced under different hydrogen contents during heat treatment in the production of the carbon supported platinum-nickel alloy catalyst in Example 1.

The organic polymer is completely decomposed and removed instead of being carbonized, when hydrogen is added thereto during high-temperature heat treatment. Accordingly, because the polymer is completely removed when hydrogen content is increased during heat treatment, the hydrogen content should be limited in order to carbonize the polymer, instead of being removed. Thus, the present invention is designed to obtain an effect of suppressing an increase in particle size by reducing hydrogen content during heat treatment and thereby allow the carbon layer to remain as a protective coating even after heat treatment. Accordingly, an attempt to establish optimal heat treatment conditions was made by XRD analysis of carbon supported platinum-nickel alloy catalysts produced under different hydrogen content conditions for heat treatment. As a result of calculation by applying platinum peak values on XRD to the Scherrer equation, platinum particle sizes calculated at hydrogen contents of 0, 5, 10, and 20% by volume were 3.7, 3.6, 3.7, and 4.1 nm, respectively. That is, when the hydrogen content was less than 5% by volume, an increase in platinum particle size could be suppressed, but when the hydrogen content was 20% by volume, the platinum particle size was significantly increased. Alloy ratio was determined in consideration of platinum peak shift on XRD. Platinum peak shifts obtained under hydrogen contents of 0, 5, 10, and 20% by volume were 1.12, 1.04, 0.98, and 1.02°, respectively. From the XRD analysis described above, it can be seen that the hydrogen content during heat treatment can control the particle size, but has no great influence on alloy ratio.

Figure 3:
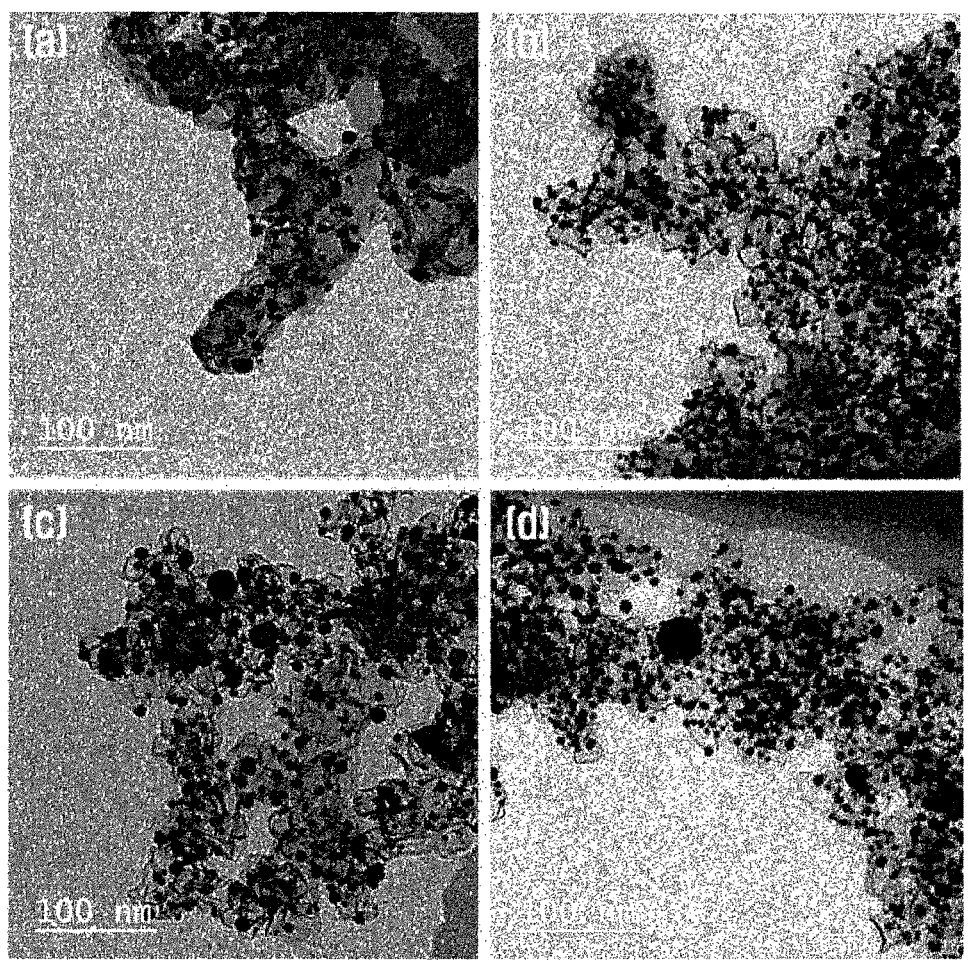
FIG. 3 is a TEM image (50,000×) showing surface morphology of the carbon-supported platinum-nickel alloy catalysts with superior durability produced under different hydrogen contents of 0, 5, 10 and 20% by volume, with respect to argon, upon heat treatment after supporting nickel on the polypyrrole (PPy) polymer-coated carbon supported platinum catalyst by precursor deposition.

FIG. 3 is a TEM image (50,000×) of catalysts produced under different hydrogen content conditions during heat treatment in the production of carbon supported platinum-nickel alloy catalysts in Example 1.

As can be seen from the TEM image, when the hydrogen content is (a) 0% by volume or (b) 5% by volume, small and uniform catalysts having no agglomerated alloy particles are produced. On the other hand, when the hydrogen content is (c) 10% by volume, slightly large particles are observed and when the hydrogen content is (d) 20% by volume, severely agglomerated particles are observed. As can be seen from the TEM image, as hydrogen content decreases during heat treatment, the amount of the organic polymer converted into the carbon layer increases, the thickness of the carbon layer increases and an increase in particle size can thus be effectively suppressed during heat treatment.

Figure 4:
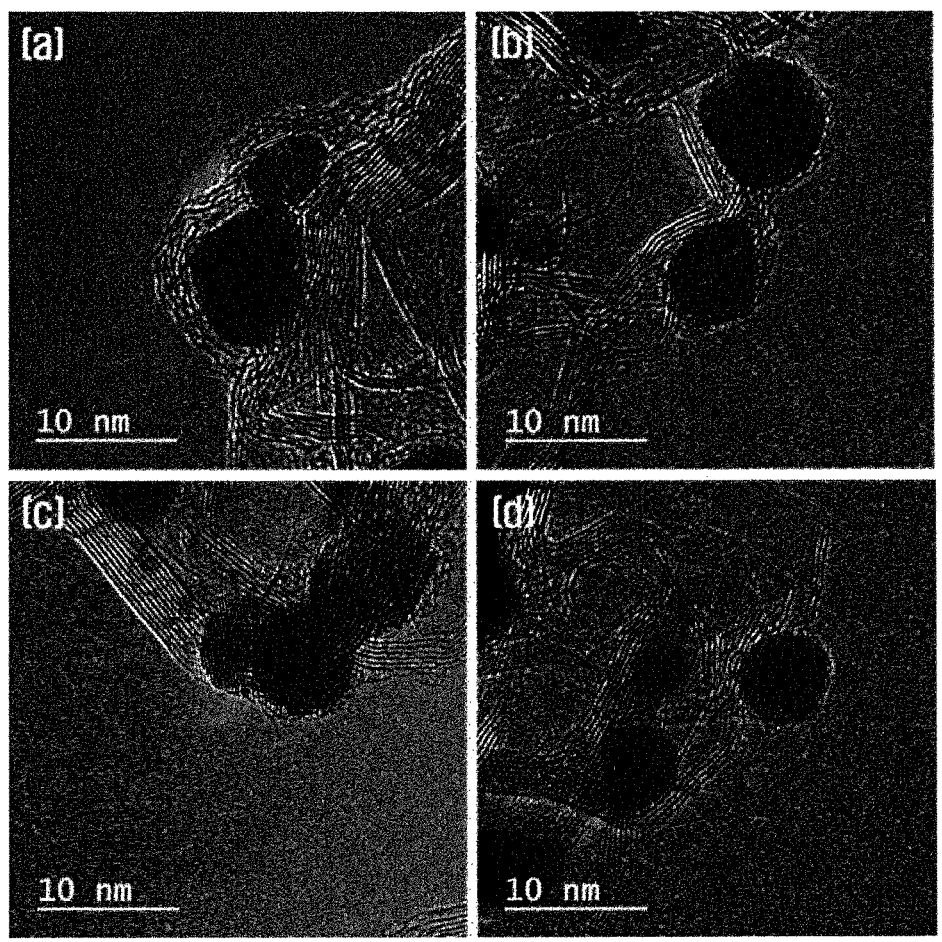
FIG. 4 is a TEM image (400,000×) showing surface morphology of the carbon-supported platinum-nickel alloy catalysts with superior durability produced under different hydrogen contents of 0, 5, 10 and 20% by volume, with respect to argon, upon heat treatment after supporting nickel on the polypyrrole (PPy) polymer-coated carbon supported platinum catalyst by precursor deposition.

FIG. 4 is an enlarged image (400,000×) of the TEM image of FIG. 3.

As can be seen from the TEM image, when the hydrogen content is (a) 0% by volume, the carbon layer is thick and, on the other hand, as the hydrogen content increases, the thickness of the carbon layer decreases and when the hydrogen content is (d) 20% by volume, almost no carbon layer is observed. Accordingly, as hydrogen content decreases during heat treatment, the amount of carbon layer increases and an increase in alloy particle size can thus be suppressed due to presence of this carbon layer.

Test Example 2

Effects of Carbon Layer on Catalytic Activity

Figure 5:
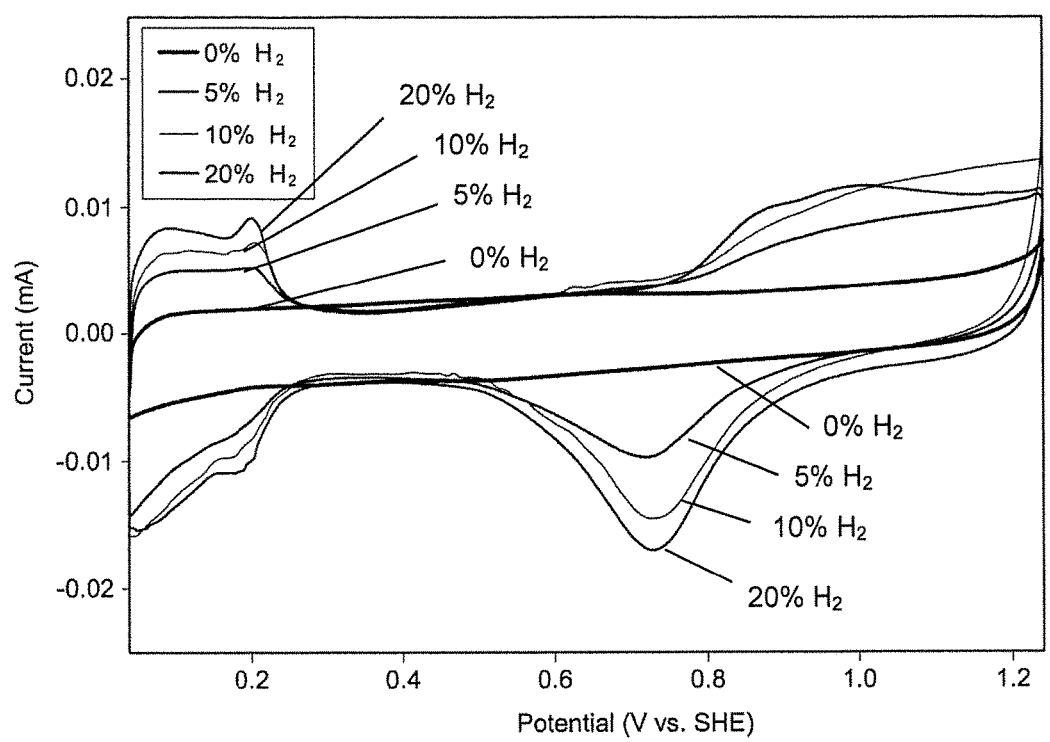
FIG. 5 is an RRDE CV graph of the carbon-supported platinum-nickel alloy catalysts with superior durability produced under different hydrogen contents of 0, 5, 10 and 20% by volume, with respect to argon, upon heat treatment after supporting nickel on the polypyrrole (PPy) polymer-coated carbon supported platinum catalyst by precursor deposition.

FIG. 5 is a rotating ring disk electrode (RRDE) cyclic voltammetry (CV) graph to measure active areas of catalysts produced under different hydrogen content conditions during heat treatment in the production of carbon supported platinum-nickel alloy catalysts in Example 1.

Cyclic voltammetry (CV) is generally used to measure an active area of a catalyst and the intensity of the platinum peak is proportional to the active area of the catalyst. In the CV graph, when the hydrogen content is 0% by volume, there is no observed platinum peak, which means that the thick carbon layer prevents platinum from contacting the solution, thereby avoiding any reaction. On the other hand, as hydrogen content increases, platinum peaks appear and are then intensified, which means that, during heat treatment, as hydrogen content increases, organic polymers are removed, instead of being converted into the carbon layer, thereby increasing the contact area between the platinum alloy catalyst and the electrolyte solution and thus the active area of the catalyst. When calculating the active area of the catalyst from the intensity of the platinum peak, the active areas of the catalyst under hydrogen contents of 0, 5, 10 and 20% by volume were gradually increased in order of 0, 25.2, 33.1, and 36.9 m²/g.

Figure 6:
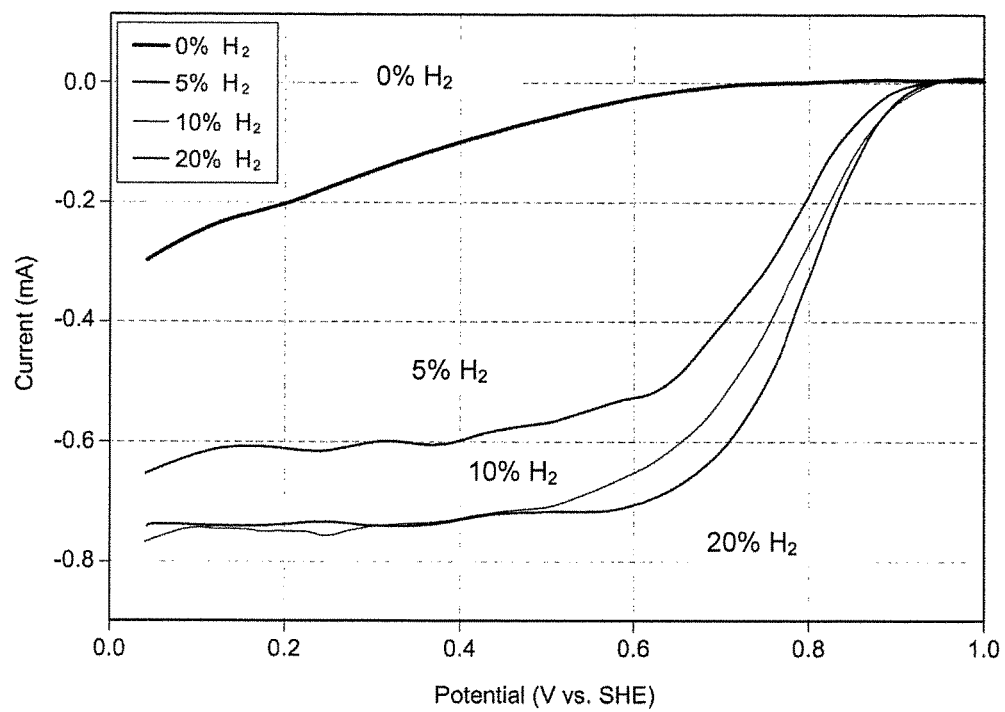
FIG. 6 is an RRDE LSV graph of the carbon supported platinum-nickel alloy catalysts with superior durability produced under different hydrogen contents of 0, 5, 10 and 20% by volume, with respect to argon, upon heat treatment after supporting nickel on the polypyrrole (PPy) polymer-coated carbon supported platinum catalyst by precursor deposition.

FIG. 6 is a rotating ring disk electrode (RRDE) linear sweep voltammetry (LSV) graph of carbon supported platinum-nickel alloy catalysts with superior durability produced under different hydrogen content conditions during heat treatment in the production of carbon supported platinum-nickel alloy catalysts in Example 1.

As can be seen from the LSV graph, as hydrogen content increases during heat treatment, oxygen reduction reaction (ORR) activity is improved. This corresponds to the behaviors of the CV graph shown in FIG. 5. That is, as hydrogen content increases during heat treatment, the carbon layer is gradually eliminated so that the area of catalytic activity increases, which resulting in improved catalyst performance, but disadvantageously, alloy particles more severely agglomerate. Accordingly, the carbon layer can reduce the particle size, but the thick carbon layer can reduce the catalytic active area.

Test Example 3

Effects of Ozone Treatment on Catalytic Activity

Figure 7:
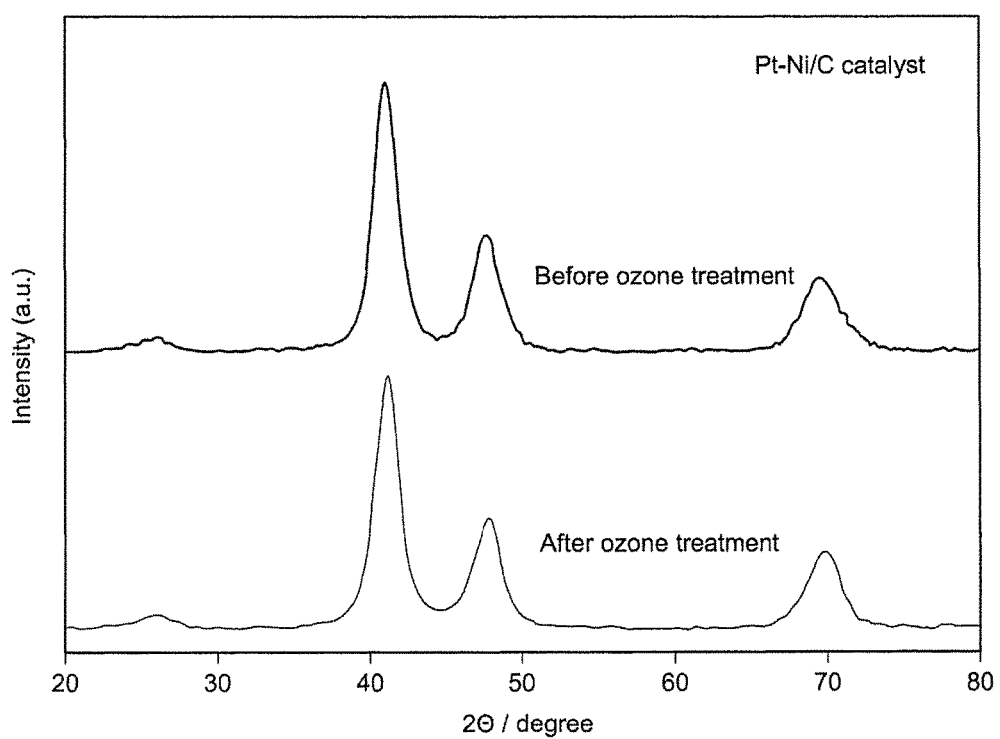
FIG. 7 is an XRD pattern showing before and after conducting ozone treatment on a carbon layer-coated carbon supported platinum alloy catalyst with superior durability.

FIG. 7 is an XRD pattern image showing before and after ozone treatment on the carbon layer-coated carbon supported platinum-nickel alloy catalyst with superior durability.

The present invention utilizes ozone to effectively remove the carbon layer coated on the catalyst with having no influences on platinum alloy catalyst particles. Ozone ($O_3$) is strongly acidic and is effective in removing carbon with low crystallinity. In order to ascertain that the ozone treatment causes physical changes of alloy particles, XRD was measured before and after ozone treatment. The platinum particle size was calculated by applying platinum peaks observed at $2\theta=39.8°$ on XRD to the Scherrer equation. In addition, the alloy ratio was determined in consideration of $2\theta$ shift of the platinum peak on XRD. As can be seen from XRD, before and after ozone treatment, the particle size and alloy ratio are constant. That is, it can be seen that ozone treatment has no effect on physical properties of alloy particles.

Figure 8:
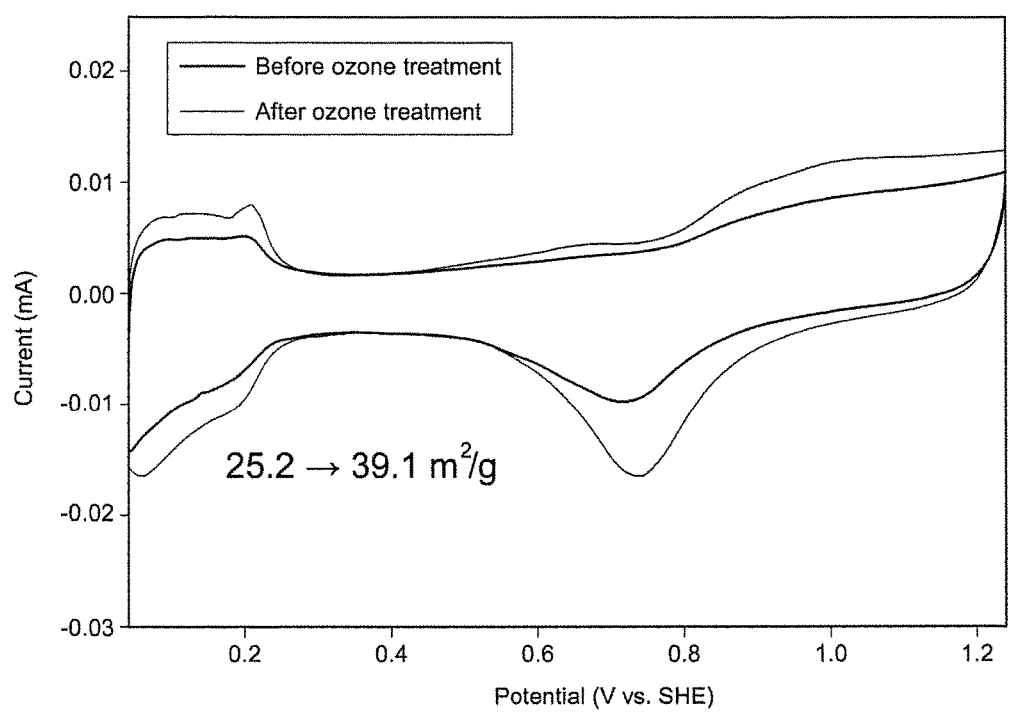
FIG. 8 is an RRDE CV graph showing before and after conducting ozone treatment on the carbon layer-coated carbon supported platinum alloy catalyst with superior durability.

FIG. 8 is an RRDE CV graph showing before and after conducting ozone treatment on the carbon layer-coated carbon supported platinum alloy catalyst.

Before ozone treatment, because the platinum alloy catalyst is coated with the carbon layer, the oxygen reduction activity of the alloy catalyst is low, while, after ozone treatment, the catalytic active area is greatly increased from 25.2 to 39.1 m²/g. This means that ozone treatment successfully removes the carbon layer introduced as a protective layer of the platinum alloy catalyst.

Figure 9:
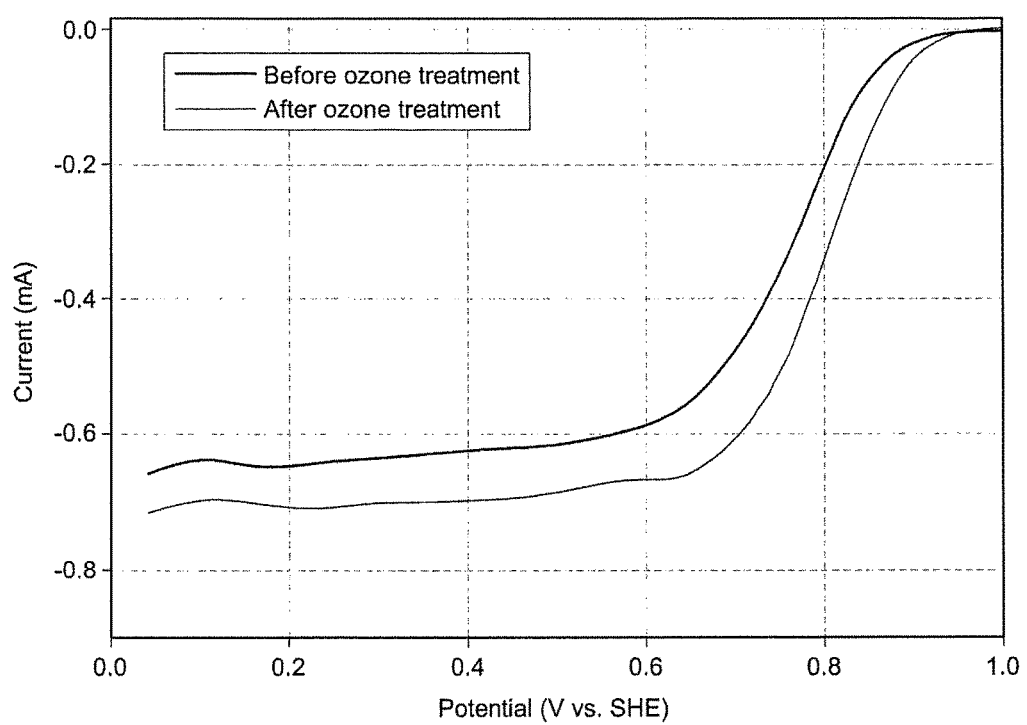
FIG. 9 is an RRDE LSV graph showing before and after conducting ozone treatment on the carbon layer-coated carbon supported platinum alloy catalyst with superior durability.

FIG. 9 is an RRDE LSV graph showing before and after conducting ozone treatment on the carbon layer-coated carbon supported platinum alloy catalyst with superior durability.

The comparison of RRDE LSV is conducted to confirm effects of the carbon layer removal on oxygen reduction reaction (ORR) activity. Before ozone treatment, the platinum alloy catalyst is covered with the carbon layer and the ORR activity of the alloy catalyst is thus low, while, after ozone treatment, the carbon layer is removed and the ORR activity of the alloy catalyst is thus greatly increased. Accordingly, because the ozone treatment to remove the carbon layer in the present invention is conducted at room temperature, the carbon layer can be effectively removed without particle growth occurring during high-temperature treatment and as a result, the obtained alloy catalyst exhibits high oxygen reduction activity.

Test Example 4

Comparison in Alloy Ratio and Particle Size Between Catalysts Produced in Example 1 and Comparative Example 1

Figure 10:
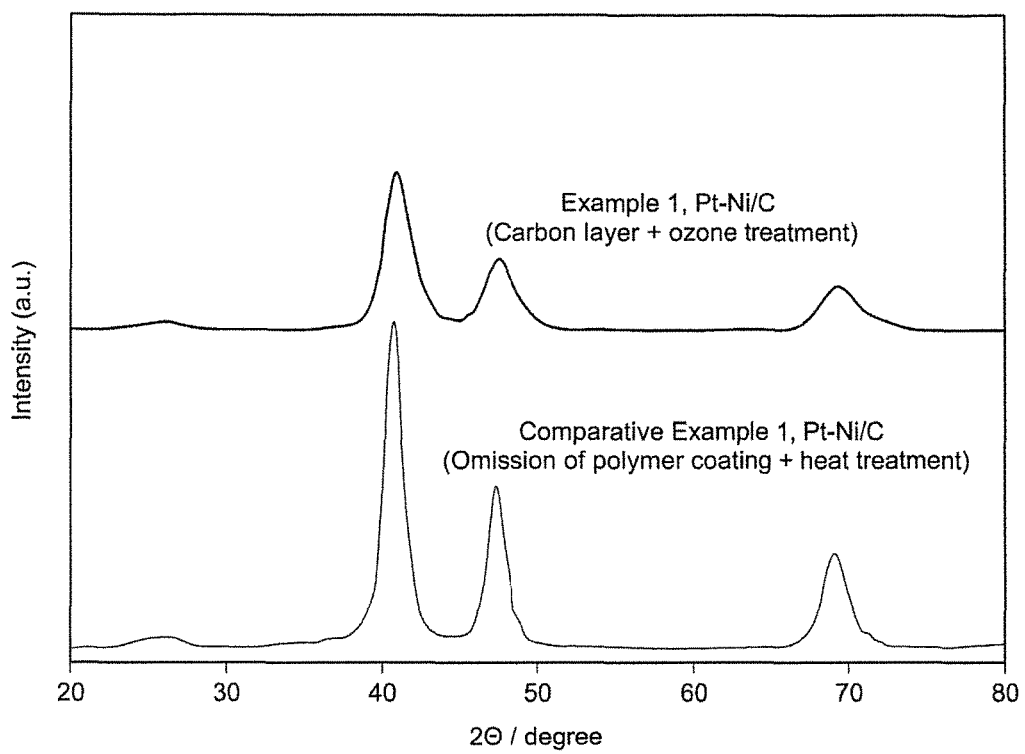
FIG. 10 shows XRD patterns of carbon supported platinum alloy (Pt—Ni/C) catalysts produced in Example 1 and Comparative Example 1.

FIG. 10 is an image comparing XRD patterns of carbon supported platinum alloy (Pt—Ni/C) catalysts produced in Example 1 and Comparative Example 1. In addition, the following Table 1 shows comparison in particle size and alloy ratio between carbons supported platinum alloy (Pt—Ni/C) catalysts produced in Example 1 and Comparative Example 1 based on XRD patterns thereof.

TABLE 1

| Catalyst | Platinum particle size and shift | | ICP | |
|---|---|---|---|---|
| Catalyst | Particle size (nm) | Shift[1] (°) | Pt (wt %) | Ni (wt %) |
| Example 1 | 3.6 | 1.04 | 43.7 | 6.4 |
| Comparative Example 1 | 8.2 | 0.82 | 43.5 | 5.7 |

[1]Shift: 2 θ Shift on XRD with respect to Pt/C catalyst

Comparative Example 1 shows an example of producing a platinum alloy catalyst without both polypyrrole coating and ozone treatment in Example 1.

The catalyst of Example 1 produced by the processes of coating a polypyrrole polymer and removing the carbon layer by ozone treatment as suggested in the present disclosure has a platinum particle size of 3.6 nm, while the catalyst of Comparative Example 1 produced without polymer coating and ozone treatment to remove the carbon layer has a particle size of 8.2 nm which is two or more times the particle size of the catalyst of Example 1.

The alloy ratio was determined in consideration of platinum peak shift of XRD patterns. The catalyst of Example 1 was shifted by 1.04° while the catalyst of Comparative Example 1 was shifted by 0.82°. That is, the catalyst of Example 1 exhibits a higher alloy ratio than the catalyst of Comparative Example 1. Accordingly since precursor deposition using the carbon layer protective coating according to the present disclosure reduces the catalyst particle size, but increases alloy ratio, it is useful as a method of producing catalysts for fuel cells.

Test Example 5

Comparison in Particle Size and Dispersibility Between Catalysts Produced in Example 1 and Comparative Example 1

Figure 11:
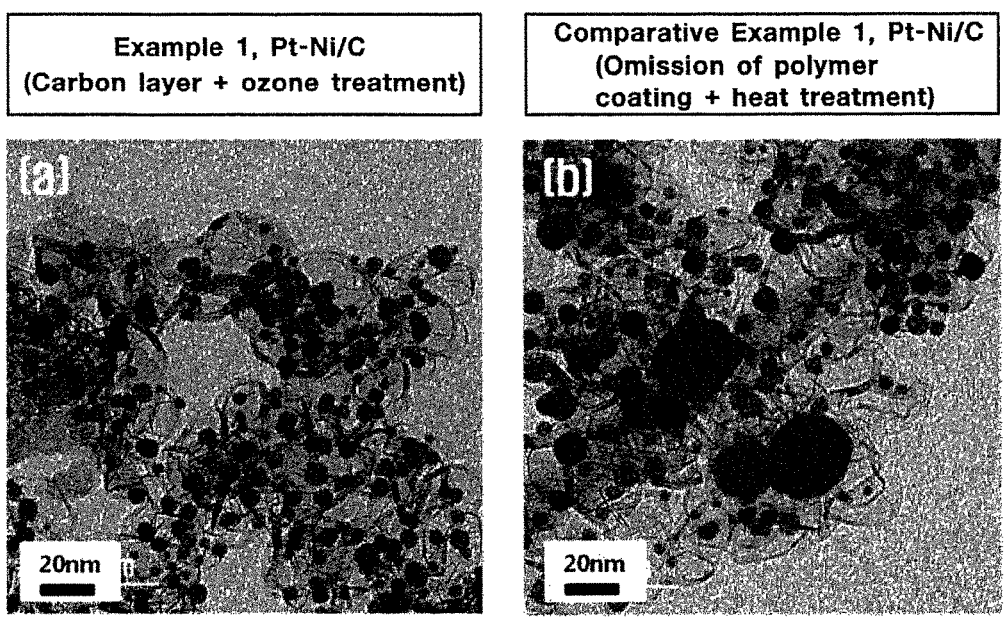
FIG. 11 is a TEM image of the carbon supported platinum alloy (Pt—Ni/C) catalysts produced in Example 1 and Comparative Example 1.

FIG. 11 is an image comparing XRD patterns of carbon supported platinum alloy (Pt—Ni/C) catalysts produced in (a) Example 1 and (b) Comparative Example 1. From the catalyst of Example 1 (a), a platinum alloy catalyst having a small and uniform particle size of 4 nm or less can be produced by using carbon layer coating. On the other hand, the catalyst of Comparative Example 1 (b) has a greatly increased particle size and poor dispersibility because it is produced without carbon layer coating. TEM image analysis shows that the carbon layer successfully suppresses an increase in particle size by high-temperature heat treatment. This TEM image analysis corresponds to particle sizes obtained by XRD.

Test Example 6

Comparison in Oxygen Performance Between Catalysts Produced in Example 1 and Comparative Example 1

Figure 12:
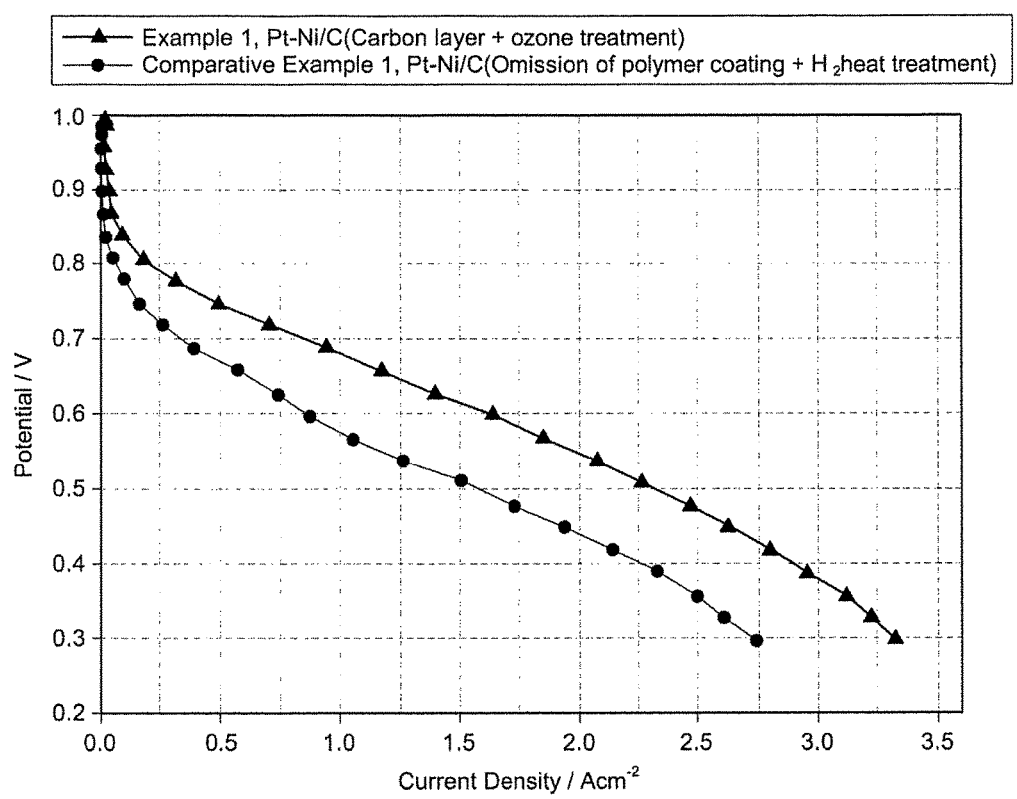
FIG. 12 is a graph comparing oxygen performance of carbon supported platinum alloy (Pt—Ni/C) catalysts produced in Example 1 and Comparative Example 1.

FIG. 12 is a graph comparing oxygen performance of carbon supported platinum alloy (Pt—Ni/C) catalysts produced in Example 1 and Comparative Example 1. For electrodes, an oxidation electrode was fabricated using 0.2 mg/cm$^{-2}$ of a generally used Pt/C catalyst based on platinum and a reduction electrode was fabricated using 0.2 mg/cm$^{-2}$ of each catalyst based on metal. For gases, at normal pressure, 150 ccm of hydrogen ($H_2$) was applied to the oxidation electrode and 150 ccm of oxygen ($O_2$) was applied to the reduction electrode. The catalyst of Example 1 produced by using the carbon layer as a protective coating exhibits performance of 1.64 Acm$^{-2}$ at 0.6V, while the catalyst of Comparative Example 1 produced without the carbon layer protective coating exhibits performance of 0.80 Acm$^{-2}$ at 0.6V. The results correspond to particle size and alloy ratio behaviors as well. Accordingly, it can be seen that the platinum alloy catalyst using the carbon layer as a protective coating maintains small particle size and has high alloy ratio even after high-temperature heat treatment, thus offering excellent catalytic activity.

Test Example 7

Comparison in Particle Size and Dispersibility Between Catalysts Produced in Example 1 and Comparative Example 2

Figure 13:
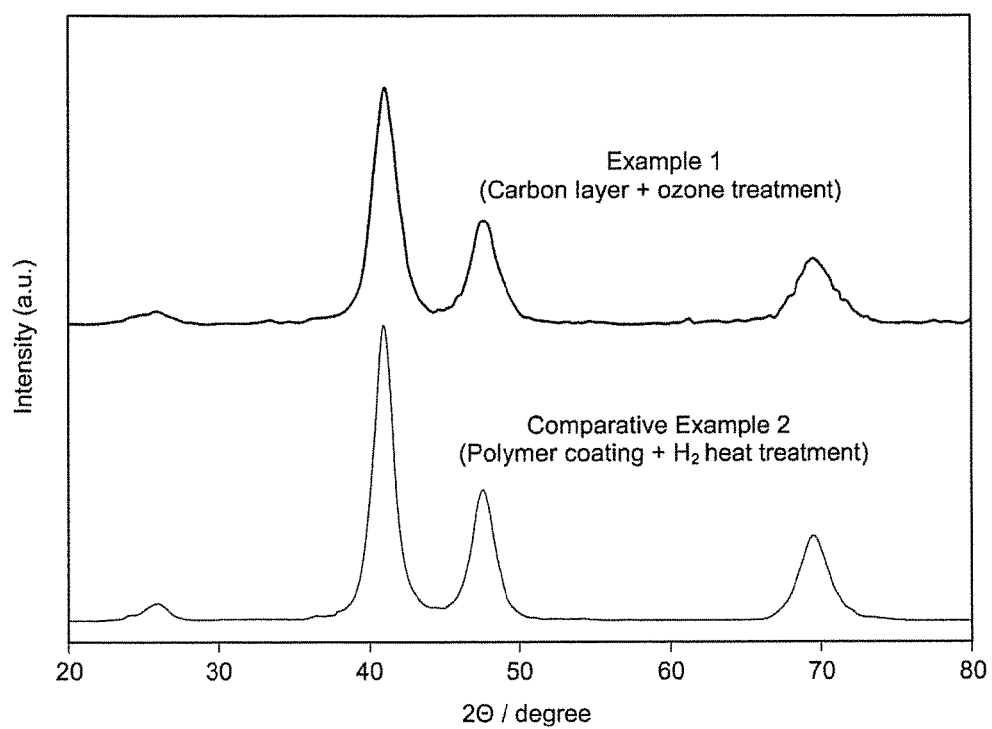
FIG. 13 is an image showing XRD patterns of carbon supported platinum alloy (Pt—Ni/C) catalysts produced in Example 1 and Comparative Example 2.

FIG. 13 is an image comparing XRD patterns of carbon supported platinum alloy (Pt—Ni/C) catalysts produced in Example 1 and Comparative Example 2. In Comparative Example 2, which follows the method suggested in Korean Patent No. 1231006, particle size increase cannot be sufficiently suppressed until heat treatment is finished, since the organic polymer is entirely decomposed and the carbon layer is thus not formed upon heat treatment at 900° C. under hydrogen atmosphere (the volume ration of argon to hydrogen=80:20). However, in the present disclosure, heat treatment is conducted at 900° C. under a limited hydrogen content of argon atmosphere (the volume ration of argon to hydrogen=95:5), so that the organic polymer is not entirely decomposed and a part thereof is converted into the carbon layer to effectively suppress particle growth occurring during heat treatment.

In addition, the following Table 2 shows comparison in particle size and alloy ratio between carbons supported platinum alloy (Pt—Ni/C) catalysts produced in Example 1 and Comparative Example 2 based on XRD patterns thereof.

TABLE 2

| | Platinum particle size and shift | | ICP | |
|---|---|---|---|---|
| Catalyst | Particle size (nm) | Shift[1] (°) | Pt (wt %) | Ni (wt %) |
| Example 1 | 3.6 | 1.04 | 43.7 | 6.4 |
| Comparative Example 2 | 4.3 | 1.00 | 43.9 | 6.3 |

[1]Shift: 2 θ Shift on XRD with respect to Pt/C catalyst

Comparative Example 2 is an example of producing a platinum alloy catalyst by conducting high-temperature heat treatment under an argon atmosphere containing 20% by volume of hydrogen in Example 1 and omitting ozone treatment to remove the carbon layer after heat treatment.

As can be seen from Table 2, the catalyst of Example 1, produced by the method suggested by the present disclosure, has a platinum particle size of 3.6 nm and thus effectively controls the particle size, while the catalyst of Comparative Example 2 has a large platinum alloy particle size of 4.2 nm. For the alloy ratio, the catalyst of Comparative Example 2 was shifted by 1.00° while the catalyst of Example 1 was shifted by 1.04°. This means that the catalyst of Example 1 exhibits a slightly greater shift than that of Comparative Example 1.

Figure 14:
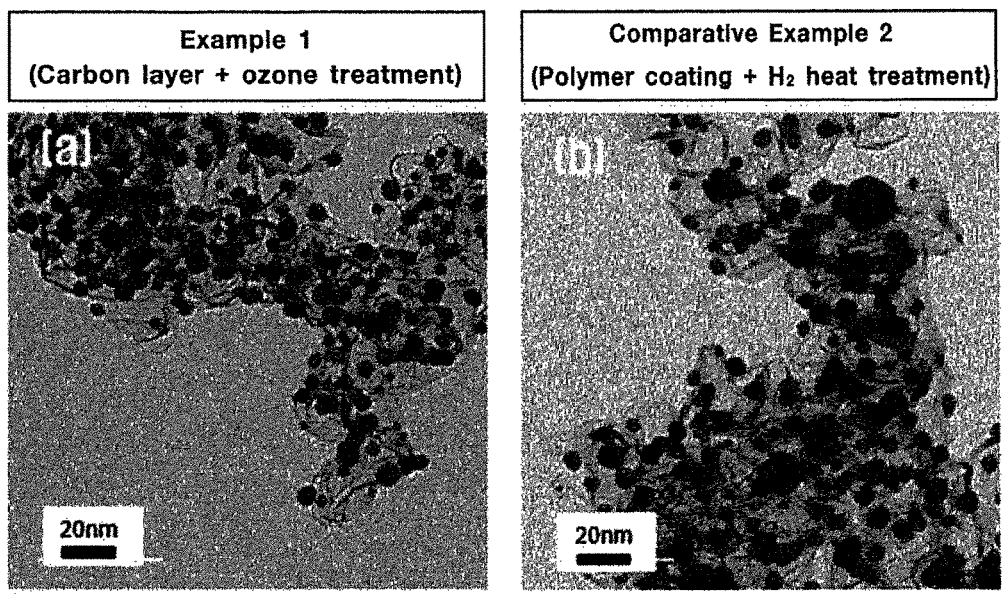
FIG. 14 is an HR-TEM image (100,000×) showing carbon supported platinum alloy (Pt—Ni/C) catalysts produced in Example 1 and Comparative Example 2.

FIG. 14 is a TEM image showing carbon supported platinum alloy (Pt—Ni/C) catalysts produced in Example 1 (a) and Comparative Example 2 (b). The catalyst of Example 1 (a) was produced as a platinum alloy catalyst having a small and uniform particle size of 4 nm or less by using carbon layer coating. On the other hand, for the catalyst of Comparative Example 2(b), the organic polymer is decomposed and removed during heat treatment, the size increase of particles produced during heat treatment cannot be effectively suppressed and many large particles are thus observed. The TEM image analysis shows that the carbon layer effectively suppresses particle size increase during high-temperature heat treatment and reduces agglomeration of particles. This TEM image analysis corresponds to XRD analysis results.

Test Example 8

Comparison in Air Performance Between Catalysts Produced in Example 1 and Comparative Example 2

Figure 15:
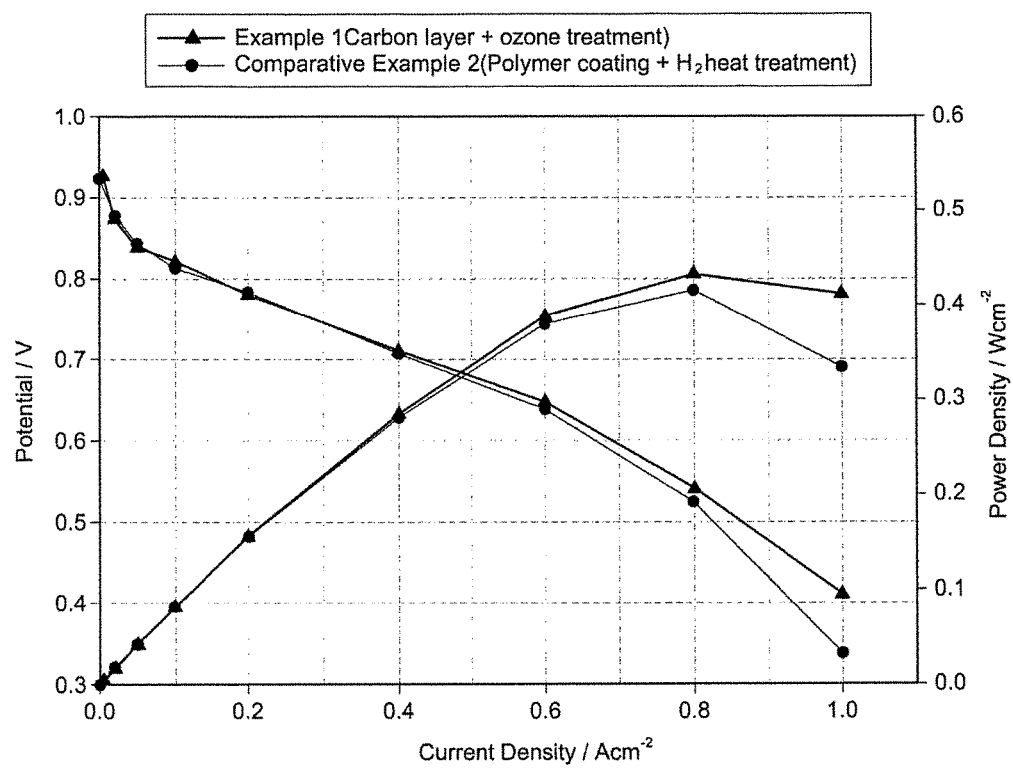
FIG. 15 is a graph comparing air performance of carbon supported platinum alloy (Pt—Ni/C) catalysts produced in Example 1 and Comparative Example 2.

FIG. 15 is a graph comparing oxygen performance of carbon supported platinum alloy (Pt—Ni/C) catalysts produced in Example 1 and Comparative Example 2. For electrodes, an oxidation electrode was fabricated using 0.2 mg $cm^{-2}$ of a generally used Pt/C catalyst based on platinum and a reduction electrode was fabricated using 0.2 mg cm-2 of each catalyst based on metal. For gases, at normal pressure, 1.5 stoic of hydrogen ($H_2$) was applied to the oxidation electrode and 2 stoic of oxygen ($O_2$) was applied to the reduction electrode. A unit cell working temperature was 65° C. and performance was evaluated from a voltage at 1 Acre.

The catalyst of Example 1 obtained by using the carbon layer as a protective coating and removing the carbon layer by ozone treatment exhibits performance of 0.44V at 1 $Acm^{-2}$, and the catalyst of Comparative Example 2 obtained by removing the polypyrrole protective coating by heat treatment under a hydrogen atmosphere exhibits performance of 0.38V at 1 Acre. In addition, the catalyst of Example 1 has a maximum power density of 0.44 $Wcm^{-2}$, while the catalyst of Comparative Example 2 has a maximum power density of 0.41 $Wcm^{-2}$. The results correspond to particle size and alloy ratio behaviors. The catalyst of Example 1 has a smaller particle size than that of Comparative Example 2 and thus mass transfer resistance is reduced, and fuel cell performance in high current density areas is improved accordingly.

In addition, the following Table 3 compares air performance and catalytic active area of carbon supported platinum alloy (Pt—Ni/C) catalysts produced in Example 1 and Comparative Example 2.

TABLE 3

| Item | Voltage (V, @ 1 $Acm^{-2}$) | Maximum current density (W $cm^{-2}$) | Active area ($m^2g^{-1}$, in CV) |
|---|---|---|---|
| Example 1 | 0.41 | 0.44 | 28.1 |
| Comparative Example 2 | 0.34 | 0.41 | 25.6 |

As can be seen from Table 3, the catalyst of Example 1 has a smaller particle size, excellent air performance and thus wider catalytic active area than the catalyst of Comparative Example 2. These results mean that the carbon layer coating can more effectively suppress particle size increase and thus provide better fuel cell performance than the organic polymer coating.

The results of Test examples described above show that the platinum alloy catalyst produced by the method according to the present disclosure exhibits improved uniformity based on particle growth suppression, enhanced dispersibility and thus improved performance of fuel cells.

As apparent from the foregoing, according to the present disclosure, the organic polymer coated on the catalyst surface is carbonized and converted into a carbon layer during heat treatment, and the carbon layer suppresses growth of particles produced during heat treatment so that a carbon supported platinum alloy catalyst having a small particle size and a high alloy ratio can be produced.

Some conventional methods also suggest control of growth of particles produced during heat treatment by coating the organic polymer on the catalyst surface. However, conventional methods involve high-temperature heat treatment under a hydrogen reduction atmosphere and thus cannot exert the effect of sufficiently suppressing the particle size increase because the organic polymer is decomposed and removed during heat treatment. However, the present disclosure involves heat treatment under an inert gas atmosphere containing no or extremely limited amount of hydrogen, so that the organic polymer is carbonized to form a carbon layer on the catalyst surface during heat treatment, and particle size increase can thus be effectively suppressed during the entire period of high-temperature heat treatment. The heat treatment according to present disclosure is apparently distinguished from conventional heat treatment involving decomposition of polypyrrole (PPy) or polydopamine (PDA) under a hydrogen atmosphere in that the carbon layer formed during heat treatment according to present disclosure is not removed by heat treatment at a high temperature of 900° C.

In addition, according to the present disclosure, the transition metal deposited on the carbon support diffuses into platinum particles during heat treatment and the platinum particles are exposed to the outer surface of the catalyst, and a platinum skin layer including densely dispersed platinum particles is formed on the surface of the platinum alloy catalyst.

In general, since a fuel cell operates under an acidic atmosphere, a transition metal in the alloy catalyst is readily eluted and the eluted transition metal permeates a membrane, increasing membrane resistance and causing deterioration in performance of the fuel cell. However, the platinum alloy catalyst according to the present disclosure includes a platinum skin layer formed on the surface thereof, suppressing elution of the transition metal and solving the problem of performance deterioration of the fuel cell.

In addition, according to the present disclosure, the carbon layer formed during heat treatment is removed by ozone treatment and the ozone treatment allows formation of a platinum skin layer including platinum particles densely dispersed on a catalyst surface with having no effect on catalyst particle size.

In addition, the carbon supported platinum alloy catalyst produced by the method according to the present disclosure is useful as an electrode for fuel cells, because it is obtained by a process suitable for mass-production, which does not include controlling an electrochemical voltage coating and conducting heat treatment on the basis of carbon supported platinum, rather than the basis of each platinum particle.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:
1. A method of producing a carbon supported platinum alloy catalyst comprising:
coating, with an organic polymer, a Pt/C catalyst comprising platinum (Pt) supported on a carbon support;

depositing a transition metal (M) precursor on the organic polymer-coated Pt/C catalyst and heat treating the Pt/C catalyst under a hydrogen-deficient atmosphere to produce a carbon layer-coated Pt-M/C catalyst; and treating the carbon layer-coated Pt-M/C catalyst with ozone ($O_3$) to produce a carbon supported platinum alloy (Pt-M/C) catalyst, the carbon layer of which is removed.

2. The method according to claim 1, wherein the transition metal (M) comprises at least one selected from a group consisting of nickel (Ni), palladium (Pd), copper (Cu), silver (Ag), gold (Au), titanium (Ti), zirconium (Zr), vanadium (V), chromium (Cr), iron (Fe), ruthenium (Ru), cobalt (Co) and rhodium (Rh).

3. The method according to claim 1, wherein the transition metal (M) is nickel (Ni) or palladium (Pd).

4. The method according to claim 1, wherein the organic polymer comprises at least one selected from a group consisting of polypyrrole (PPy), polyaniline (PANI) and polydopamine (PDA).

5. The method according to claim 1, wherein the carbon support comprises at least one selected from a group consisting of carbon black and crystalline carbon.

6. The method according to claim 5, wherein the crystalline carbon comprises at least one selected from a group consisting of carbon nanotube (CNT), carbon nanofiber (CNF), carbon nanocoil, and carbon nanocage (CNC).

7. The method according to claim 1, wherein the carbon support is carbon nanocage (CNC) or carbon nanotube (CNT).

8. The method according to claim 1, wherein the heat treatment is conducted under an inert gas at 700° C. to 1,200° C.

9. The method according to claim 8, wherein the inert gas contains hydrogen of an amount less than 5% by volume.

10. The method according to claim 9, wherein the inert gas is argon.

11. A method of producing a carbon supported platinum alloy catalyst comprising:

coating, with an organic polymer, a Pt-M/C catalyst comprising platinum (Pt) and a transition metal (M) supported on a carbon support;

heat-treating the organic polymer-coated Pt-M/C catalyst under a hydrogen-deficient atmosphere to produce a carbon layer-coated Pt-M/C catalyst; and treating the carbon layer-coated Pt-M/C catalyst with ozone ($O_3$) to produce a carbon supported platinum alloy (Pt-M/C) catalyst, the carbon layer of which is removed.

12. The method according to claim 11, wherein the transition metal (M) comprises at least one selected from a group consisting of nickel (Ni), palladium (Pd), copper (Cu), silver (Ag), gold (Au), titanium (Ti), zirconium (Zr), vanadium (V), chromium (Cr), iron (Fe), ruthenium (Ru), cobalt (Co) and rhodium (Rh).

13. The method according to claim 11, wherein the transition metal (M) is nickel (Ni) or palladium (Pd).

14. The method according to claim 11, wherein the organic polymer comprises at least one selected from a group consisting of polypyrrole (PPy), polyaniline (PANI) and polydopamine (PDA).

15. The method according to claim 11, wherein the carbon support comprises at least one selected from a group consisting of carbon black and crystalline carbon.

16. The method according to claim 15, wherein the crystalline carbon comprises at least one selected from a group consisting of carbon nanotube (CNT), carbon nanofiber (CNF), carbon nanocoil, and carbon nanocage (CNC).

17. The method according to claim 11, wherein the carbon support is carbon nanocage (CNC) or carbon nanotube (CNT).

18. The method according to claim 11, wherein the heat treatment is conducted under an inert gas at 700° C. to 1,200° C.

19. The method according to claim 18, wherein the inert gas contains hydrogen in an amount less than 5% by volume.

20. The method according to claim 19, wherein the inert gas is argon.

* * * * *